US006684863B2

(12) United States Patent
Dixon et al.

(10) Patent No.: US 6,684,863 B2
(45) Date of Patent: Feb. 3, 2004

(54) CONTROL SYSTEM FOR AN INTERNAL COMBUSTION ENGINE BOOSTED WITH AN ELECTRONICALLY CONTROLLED COMPRESSOR

(75) Inventors: Jon Dixon, Maldon (GB); Roshan Sena Wijetunge, London (GB)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/264,628

(22) Filed: Oct. 4, 2002

(65) Prior Publication Data
US 2003/0106541 A1 Jun. 12, 2003

(30) Foreign Application Priority Data
Oct. 4, 2001 (EP) ............................. 01308484

(51) Int. Cl.[7] ................................ F02B 33/00
(52) U.S. Cl. ..................... 123/565; 123/559.1
(58) Field of Search ............... 123/565, 559.1; 60/608

(56) References Cited

U.S. PATENT DOCUMENTS

| 4,617,895 A | 10/1986 | Sakakibara et al. |
| 4,757,686 A | 7/1988 | Kawamura et al. |
| 4,774,811 A | 10/1988 | Kawamura |
| 5,022,375 A | * 6/1991 | Goto et al. .................. 123/564 |
| 5,291,871 A | * 3/1994 | Shirai ......................... 123/564 |
| 5,426,589 A | 6/1995 | Kitagawa et al. |

FOREIGN PATENT DOCUMENTS

| DE | 19712850 | 10/1998 | |
| EP | 0397316 | 11/1990 | |
| EP | 1300559 A1 | * 4/2003 | ........... F02B/39/10 |
| GB | 2365070 A | * 2/2002 | ........... F02B/39/10 |
| JP | 06219188 | 8/1994 | |
| JP | 10159577 | 6/1998 | |
| WO | WO 02/10565 A1 | * 2/2002 | ........... F02B/39/10 |

* cited by examiner

Primary Examiner—Thomas Denion
Assistant Examiner—Thai Ba Trieu
(74) Attorney, Agent, or Firm—Brinks Hofer Gilson & Lione

(57) ABSTRACT

The present invention relates to an electronically driven pressure boosting system that is used to boost the torque output of an Internal combustion engine. Engine operating parameters are fed to an engine control unit (ECU) controlling a supercharger that boosts engine torque. The ECU monitors at least one of the engine operating parameters and calculates the likelihood that the engine torque needs to be boosted by the supercharger. When the supercharger is operating at an idle speed, the ECU controls the idle speed so that a lag time varies inversely with the calculated likelihood that the supercharger needs to boost engine torque.

15 Claims, 7 Drawing Sheets

CONTROL SYSTEM FOR AN INTERNAL COMBUSTION ENGINE BOOSTED WITH AN ELECTRONICALLY CONTROLLED COMPRESSOR

BACKGROUND a. Field of the Invention

The present invention relates to an electronically driven pressure boosting system that is used to boost the torque output of an internal combustion engine.

b. Related Art

One way to boost the torque and peak power provided by a reciprocating piston internal combustion engine, is to use a pressure boosting device to increase the mass airflow into the engine. The increased air supply then permits a greater amount of fuel to be combusted in each ignition event.

Examples of pressure boosting devices include turbochargers and superchargers, referred to herein collectively as "compressors". A turbocharger is driven entirely or partly by energy in the exhaust stream. This is an efficient use of otherwise mostly wasted energy, but such devices suffer from the limitation that the boost is not available or significant at low engine speeds (rpms). The time taken for the boosted torque to become apparent to the driver is called "turbo lag". Often, a driver may demand high torque from an engine at low rpms, for example at the start of an overtaking manoeuvre. If the pressure boost device is driven only by exhaust gasses, then boosted torque will not be available at low rpms.

One way of dealing with the limitation is to provide an electrical motor connected to the turbocharger, which is energised when the turbo boost is insufficient. This type of electrically driven pressure boosting device is, however, expensive in terms of hardware cost. Another solution is to use a supercharger, that is, a compressor device that is driven by means other than an exhaust gas turbine, for example via a mechanical linkage to the engine, or by an electrical motor driven from the vehicle battery and/or battery charging system. Mechanical supercharger systems can however, be mechanically bulky and expensive, and do not reduce "turbo lag". Electrically driven supercharger systems provide a lower cost and compact solution, but can require a significant amount of electrical energy when driven, for example, up to three times the current which can normally be supplied by a typical motor vehicle 12 volt battery. A typical electrical motor for a supercharger driven from a conventional motor vehicle electrical power supply system, can take up to 0.5 seconds to reach operating speed. Although this is a considerable reduction in lag compared with an exhaust gas driven turbocharger, this is still a noticeable lag for the vehicle driver.

Motor vehicle alternators are typically specified to provide either all or most of the power requirement for the entire vehicle, the battery only being used to store sufficient electrical power to start the vehicle engine and occasionally deliver power when the accessory load exceeds the alternator output. Typical European vehicle alternators are specified to provide about 130 A of current, while an electrically powered supercharger can require in excess of 300 A. An alternator able to supply this much current is significantly more expensive, heavy and bulky than a conventional alternator.

Because the pressure-boosting device cannot be 100% efficient, there will also be inevitable electrical and mechanical losses associated with the device, that can place significant mechanical and thermal stress on components within the device.

The expense of increasing the capacity of the vehicle battery and charging system, or the dealing with inherent thermal and mechanical limits of components within the pressure boosting device, to meet any level of driver demand can easily outweigh the benefits of using an electrically driven compressor. Therefore it is important to drive such a device in an efficient manner, and within the limits of the vehicle electrical power supply, and thermal and mechanical limits of the device itself. At the same time, it is important to minimise lag and to maximise the torque boost benefit perceived by the driver over as wide a range of driving conditions as possible. Because the level at which an electrically driven pressure boosting device is driven, is essentially independent from the engine operating speed, it is therefore necessary to devise an appropriate control system for operating the pressure boosting device that takes account of the system's limitations.

SUMMARY OF THE INVENTION

It is an object of the present invention to provide a convenient and economical electrical pressure boosting device and method for increasing the torque available from an internal combustion engine.

According to the invention, there is provided a torque boosting system for boosting the torque of an internal combustion engine, said system comprising means for generating one or more engine operating parameters, an electrically driven rotary compressor for assisting aspiration of the engine to boost engine torque, an electrical supply system for providing electrical power to drive the compressor, and an electronic control system responsive to the engine operating parameter(s) to control the operation of the engine and the compressor such that in an idle mode of operation of the compressor said device does not assist the aspiration of the engine, and in a boost mode of operation of the compressor said device does assist the aspiration of the engine, wherein:

a) the compressor in the idle mode of operation operates within a first range of speeds and in the boost mode of operation operates within a second range of speeds, the second range of speeds being greater than the first range of speeds;

b) when activated by the electronic control system, the compressor requires a lag time to accelerate from an idle speed within the first range of speeds to a boost speed within the second range of speeds;

c) the electronic control system monitors the engine operating parameter(s) and calculates therefrom a likelihood that the engine torque will need to be boosted by the compressor; and d) when the compressor is operating at an idle speed, the electronic control system controls said idle speed so that the lag time varies inversely with the calculated likelihood that the compressor will be needed to boost engine torque.

Also according to the invention, there is provided a method of using a torque boosting system to boost the torque of an internal combustion engine, said system comprising means for generating one or more engine operating parameters, an electrically driven rotary compressor for assisting aspiration of the engine to boost engine torque, an electrical supply system for providing electrical power to drive the compressor, and an electronic control system responsive to the engine operating parameter(s) to control the operation of the engine and the compressor, wherein the method comprises the steps of:

i) operating the compressor in an idle mode of operation within a range of idle speeds in which the compressor does not assist engine aspiration;

ii) after step i), operating the compressor in a boost mode of operation within a range of boost speeds in which the compressor does assist engine operation, the compressor requiring a lag time in order to accelerate from an idle speed to a boost speed;

iii) prior to step ii), using the electronic control system to monitor one or more engine operating parameters, and to calculate therefrom a likelihood that the engine torque will need to be boosted by the compressor to meet future driver demand; and then iv) using the electronic control system to vary the idle speeds so that the lag time varies inversely with the calculated likelihood that the compressor will be needed to boost engine torque.

The inverse relationship between the calculated likelihood and the lag time may be a simple 1/x inverse relationship, or any other suitable function in which the lag time decreases with increasing likelihood, or vice versa.

Several benefits flow from this approach. First of all, the higher the idle speed, the greater the reduction in lag time. The lag time is therefore reduced most in situations where it is judged most likely that compressor boost will be required.

Second, because the idle speed of the compressor is variable, the compressor will not in general be run continuously at a high idle speed. Since current consumption for commercially available compressor devices tends to increase with the square of the compressor speed, this results in a significant savings in terms of electrical power consumption. This in turn reduces the required capacity of the electrical supply system.

Third, a continuously high idle speed would result in the compressor becoming hot, owing to inevitable friction in moving parts, and less than 100% efficiency in the electric motor. By varying the idle speed according to the calculated likelihood of required compressor boost, the compressor temperature is kept lower than it would otherwise be at a continually high idle speed.

Fourth, because some rotational energy will be stored in the compressor prior to the acceleration of the compressor to boost speed, there will be a reduction in the peak electrical current needed to bring the compressor up to boost speed, for any given lag time.

The compressor may, of course, be kept idling for some time, but when the likelihood drops below a threshold value, the idling speed may be dropped to zero in order to conserve electrical power, and to reduce the temperature of the compressor.

In a preferred embodiment of the invention, the calculation of the likelihood that the engine torque will need to be boosted by the compressor to meet future driver demand includes a calculation using the history of one or more of the engine operating parameters. This calculation can then be weighted towards engine operating parameters from more recent times rather than less recent times. This helps to improve the accuracy of the likelihood calculation.

When the system is incorporated in a motor vehicle, the system may include a speed control system for generating a driver demand signal, for example an accelerator pedal and an electronic pedal position sensor, or an electronic cruise control system linked to an engine management system. One engine operating parameter can then be the driver demand signal. In a preferred embodiment of the invention, the electronic control system monitors pedal position and how "busy" the pedal is, that is, the magnitude of pedal movement and the speed of such pedal movement, both towards higher driver demand and towards lower driver demand, as both types of movement are indicative of aggressive or passive driver behaviour.

The system may additionally include a gear change system through which the engine torque is transmitted, in which case one engine operating parameter is the state of the gear change system.

When the system includes an engine speed sensor, one engine operating parameter may be the engine speed. When engine torque required to satisfy the driver demand approaches the maximum torque available at a particular engine speed, then it becomes more likely that torque boost will be required.

In a preferred embodiment of the invention, there are a plurality of engine operating parameters, at least one of which is a limiting parameter that may restrict use of the compressor. The method then comprises the step of: using the electronic control system to monitor said limiting parameter(s), and to calculate therefrom a likelihood that said limiting parameters may limit the ability of the compressor to meet future driver demand; and then using the electronic control system to vary the idle speeds so that the lag time varies directly with the calculated likelihood that the ability of the compressor to meet future driver demand will be restricted.

One type of limiting parameter may be the temperature of the compressor. Therefore, the system may comprise a compressor temperature sensor, in order to measure the temperature of the compressor.

Since the system may include an electrical supply system for providing electrical power to drive the compressor, one limiting parameter may be the ability of the electrical supply system to provide electrical power to drive the compressor to boost engine torque. In a motor vehicle, the electrical supply system usually includes a battery and an engine-driven battery recharger. The method then comprises the step of isolating at least partially the battery from the engine-driven battery recharger to drive the compressor using the battery, said limiting parameter being the battery state-of-charge determined for example from the battery state-of-charge.

This takes advantage of the fact that in general the peak current available from the battery will be several times greater than the continuous current available from the battery charging device, e.g. an alternator. The battery charging device can then continue to provide a steady current to other electrical consumers, while the battery can at least for some time supply the relatively high current required to run the compressor, particularly when the compressor is an electrically powered supercharger.

When the electrical supply system includes a battery and an engine-driven battery recharger, said state of the electrical supply system can be determined from an electrical load on the battery recharger, for example as compared with a maximum acceptable load on the battery recharger.

Preferably, the calculation of said ability of the compressor to meet future driver demand includes a calculation using the history of one or more of the engine operating parameters. The calculation of the ability of the compressor to meet future driver demand may then be weighted towards said additional operating parameters from more recent times rather than less recent times.

BRIEF DESCRIPTION OF THE DRAWINGS

The invention will now be described in further detail, and by way of example only, with reference to the accompanying drawings, in which.

DETAILED DESCRIPTION

Figure 1:
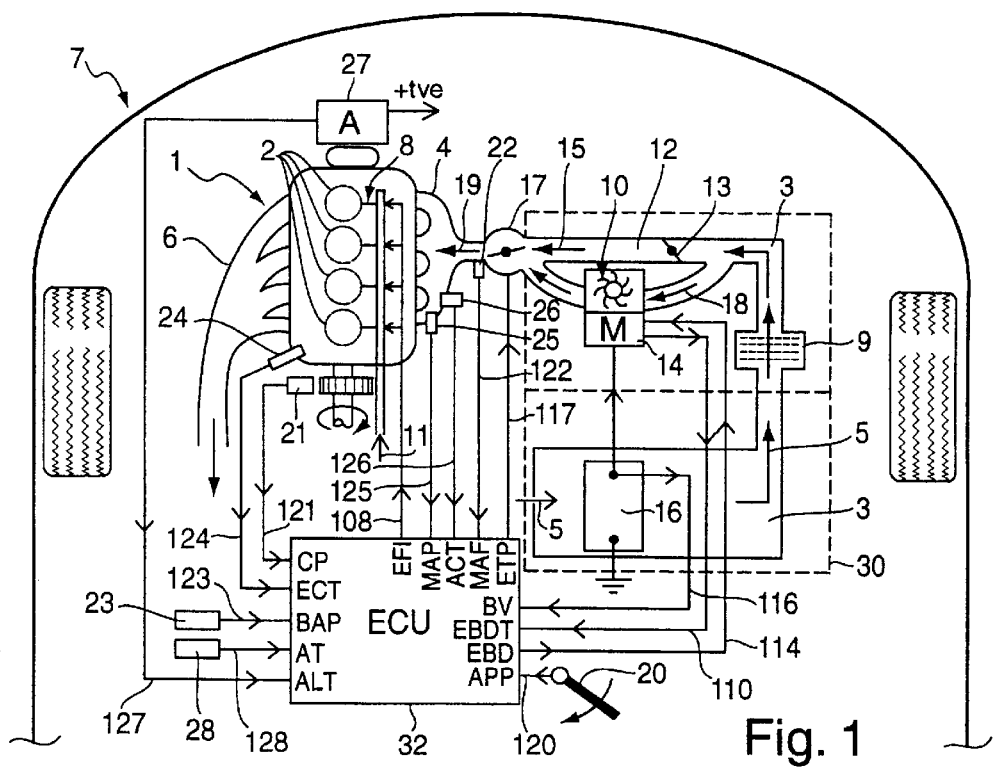
FIG. 1 is a schematic diagram of a motor vehicle having a 1.4 litre, four cylinder engine system with air charge boosting system including a compressor and an engine control system, according to the invention.

FIG. 1 shows schematically part of a motor vehicle 7 having a reciprocating piston internal combustion engine 1, with four in-line cylinders 2, an air inlet manifold 4 and an exhaust manifold 6 leading respectively to and from each of the cylinders 2. A fuel injection system 8 supplies fuel 11 to cylinders 2 in a manner well-known in the art. An electrically driven boost device (EBD) 10 or compressor, which may be a turbocharger, a supercharger or any other device adapted to provide boost to the vehicle (hereinafter just "supercharger"), is provided upstream of the inlet manifold 4.

Air flows to the inlet manifold 4 through the supercharger 10 when this is operational, or when the supercharger 10 is disabled or idling, through an air bypass conduit 12 in parallel with the supercharger 10. Air is supplied to the supercharger 10 and/or the bypass 12 along an inlet air path 3.

The air bypass conduit 12 has an air valve 13 that automatically opens to permit inlet air 5 to bypass 15 the supercharger 10 when airflow 18 through the supercharger 10 is insufficient to charge the engine cylinders 2 with air. Air supply 19 to the engine 1 is then controlled by the setting of an electronically controlled throttle valve 17 downstream of the supercharger 10 and bypass 12, and the activation of the supercharger 10. When the supercharger 10 is not activated, the engine 1 is normally aspirated, and when the supercharger 10 is activated, the airflow to the engine is increased.

The supercharger 10 is driven only by a switched reluctance electrical motor (M) 14 powered by a 12-volt lead/acid vehicle battery 16. The battery 16 is recharged by an engine-driven battery recharger, illustrated and further referred to herein as a belt-driven alternator 27, although other devices serving the same function may be used. The battery 16 has a current rating which is about 30 A higher than would normally be specified for a mass-market four cylinder engine motor vehicle. In addition to powering the supercharger 10, the battery 16 also provides for the vehicle starting, lighting and ignition requirements. The battery 16 also lies within the air supply path 3, within a hollow enclosure 30 that surrounds the battery 16 and supercharger 10, so that inlet air 5 flows around the battery 16. An air filter 9 is provided in the air supply path 3 downstream of the battery 16 and upstream of the supercharger 10 and air bypass 12.

The vehicle driver (not shown) can control the engine power via a movable accelerator pedal assembly 20, that provides an electrical signal 120 to an engine control unit (ECU) 32 indicative of accelerator pedal position (APP).

The engine control unit monitors several engine operating parameters via nine input lines 116, 120–127. One line 116 is connected to the battery supply so that an A/D converter (not shown) within the ECU 32 can measure the battery 16 voltage. Another input line 127 comes from the alternator, which has its own internal electronics and processor (not shown) that monitor the temperature of the alternator, and also capacity ultilization of the alternator, depending on the alternator temperature, alternator rotational speed and current drawn from the alternator. The alternator capacity utilization is communicated from the alternator to the ECU 32 along the line 127.

Seven other input lines 120–126 are each connected to a corresponding sensor devices 20–26 for measuring engine operating conditions. The sensors include: the accelerator pedal assembly (APP) 20 for measuring driver demand; a crank position (CP) sensor 21 for measuring engine speed; a mass air flow sensor (MAF) 22 downstream of the throttle 17 for measuring directly the amount of air entering the cylinders 2; a barometric air pressure (BAP) sensor 23 for measuring atmospheric pressure; an engine coolant temperature (ECT) sensor 24 for measuring the temperature of coolant circulating in the engine; a manifold air pressure (MAP) sensor 25 for measuring the pressure of air in the inlet manifold 4; and an inlet air charge temperature (ACT) sensor 26 for measuring the temperature of the inlet air.

Additionally, an ambient temperature (AT) sensor 28 measures the ambient air temperature and provides an input on line 128 to the electronic control unit 32.

Optionally, control electronics in the motor 14 provides a temperature signal (EBDT) 110 to the engine control unit 32. Alternatively, the engine control unit may calculate temperature parameters for the EBD 10 based on the ambient temperature signal 128 from the ambient temperature sensor 28, and the speed and duty cycle of the EBD 10.

As will be explained in more detail below, the engine control unit 32 calculates an engine torque demand from the various input signals, and provides a number of output signals to control various vehicle and engine operating parameters, including a fuel injection control signal 108, throttle valve control signal 30 and a supercharger motor control signal 114. The engine torque demand is therefore set at least in part by the position of the accelerator pedal 20.

As will be explained in more detail below, when the driver moves the accelerator pedal 20 to demand engine torque in excess of that which can be delivered by the engine 1 when naturally aspirated, the throttle valve 17 moves to a maximum setting to admit the maximum volume of air 19 into the cylinders 2. The engine control unit 32 then activates the supercharger motor 14 under certain moderate or low engine speeds, but not at high engine speeds. As long as the torque demand exceeds that available from natural aspiration of the engine alone, the boosted engine torque output is controlled by the supercharger speed and the amount of fuel supplied to the cylinders. As soon as torque demand falls within that available from natural aspiration, the electrically driven supercharger 10 is no longer driven by the motor 14. This helps to conserve battery lifetime, and reduce heating of the supercharger 10, thereby preserving battery capacity and extending the lifetime of the supercharger 10. If the engine is an injection engine, the engine control unit 32 can control the amount of injected fuel 11 by electrical control 108 of the injectors 8.

When supercharger operation is required, the engine control unit 32 sets both the speed of the supercharger 10 and delivered fuel amount according to the current torque demand. The engine control unit 32 monitors the output 120–126 from the various sensors 20–26, as well as the battery voltage 116, and then adjusts the supercharger speed and/or the amount of delivered fuel 11 to achieve an appropriate level of rich or lean engine operation.

Figure 2:
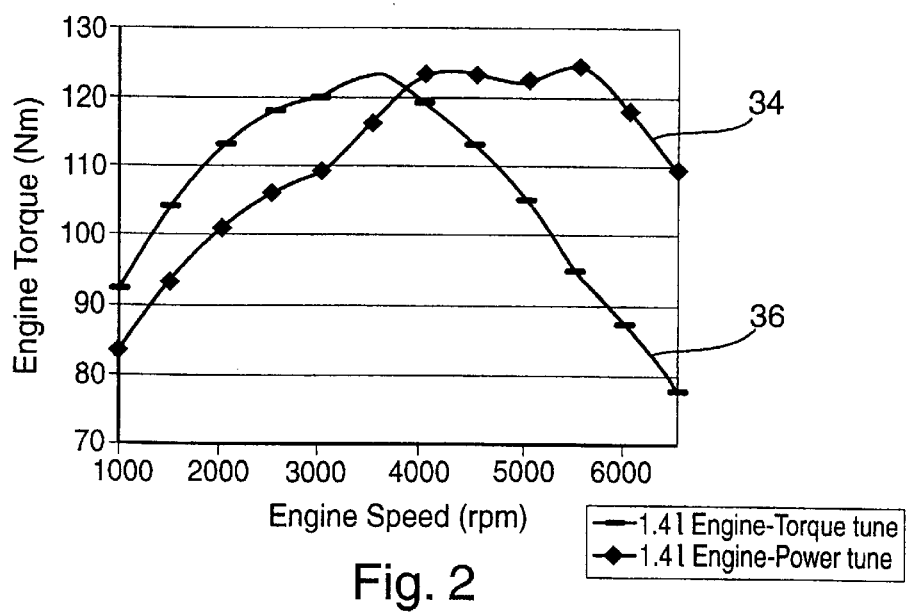
FIG. 2 is a graph plotting engine torque against engine speed for the 1.4 litre engine of FIG. 1 when naturally aspirated, tuned either for maximum torque at a low moderate engine speed, or maximum engine torque at a higher moderate engine speed.

FIG. 2 shows a graph of engine torque against engine speed for a conventional four-cylinder in-line engine, such as that described above, but without supercharging. As can be seen from curve 34 of FIG. 2, the engine can be tuned to provide good power at moderately high engine speeds ("power tune"), but at the expense of low-end torque.

Alternatively, as shown by curve 36, the engine can be tuned to give good torque at low and moderate engine speeds ("torque tune"), but at the expense of top-end power. Whilst "power tune" will appeal to the 'sporting' driver, it will result in lower levels of satisfaction for the majority of car owners. The requirement to deliver good real world 'performance feel' commonly results in an engine torque output as shown in the "torque tune" curve, where torque at high engine speeds has been compromised in order to promote torque output below 3500 rpm. Although engine gearing can be selected to minimize undesirable characteristics, in practice conventional engines are tuned to achieve a compromise.

Figure 3:
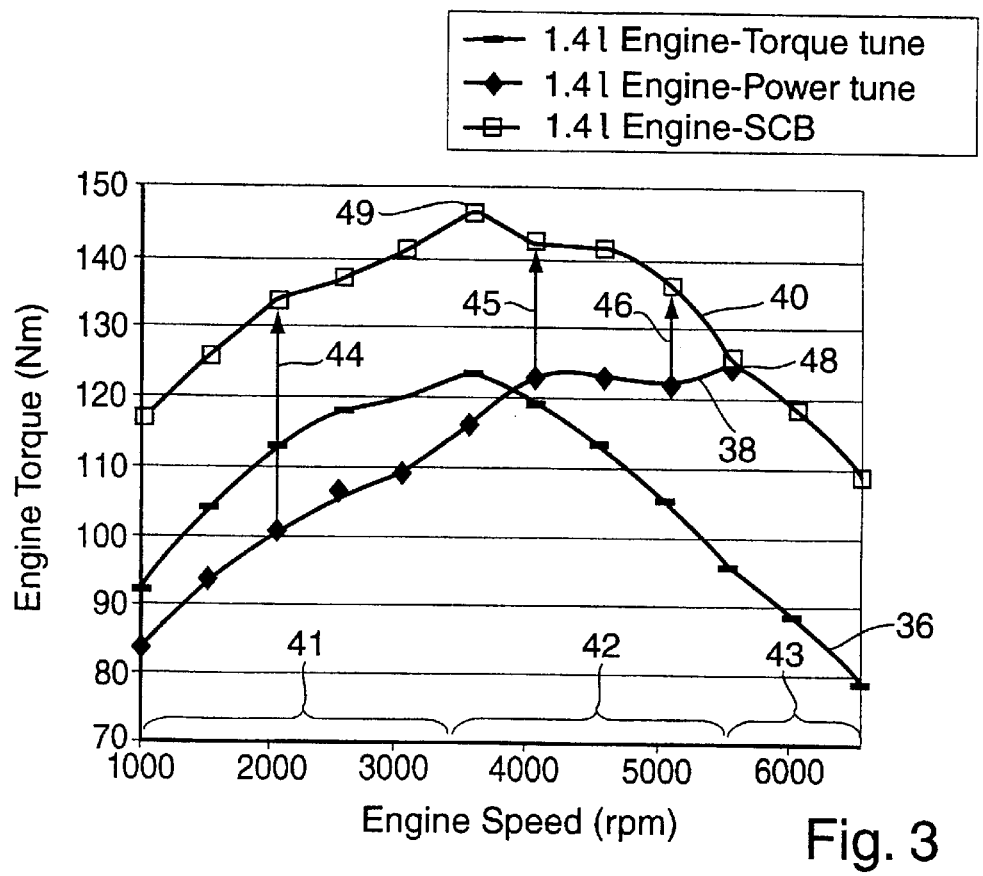
FIG. 3 is a graph similar to that of FIG. 2, showing also the effect on engine torque output with the engine of FIG. 1 when using the air charge boosting system.

With reference to FIG. 3, in the preferred embodiment of the invention, a relatively low capacity engine, for example below about 1.8 litres capacity, is tuned to give good torque at high rpm 43, at the expense of torque at low engine speed 41 and moderate engine speed 42, as illustrated by curve 38. This has the secondary effect of allowing good fuel economy at steady highway cruising speeds through the need to use wider throttle openings to achieve cruising speed. As can be seen from curve 40 for supercharger boost (SCB), there is then an increase 44, 45, 46 in maximum available engine torque when the driver demands power in excess of that available from a naturally aspirated engine. The boost is made available under control of the engine control unit 32 only in a region of low 41 and moderate 42 engine speeds, and is progressively limited to transition smoothly into engine power near or at a peak 48 in the un-boosted torque curve 38 in a region of relatively high engine speed 43. This is done by progressively limiting the maximum allowable supercharger boost near point 48.

Thus, the engine control unit 32 enables use of the supercharger 10 only in such a way that the engine torque output with the supercharger torque boost peaks 49 in the region of moderate engine speed 42.

Figure 4:
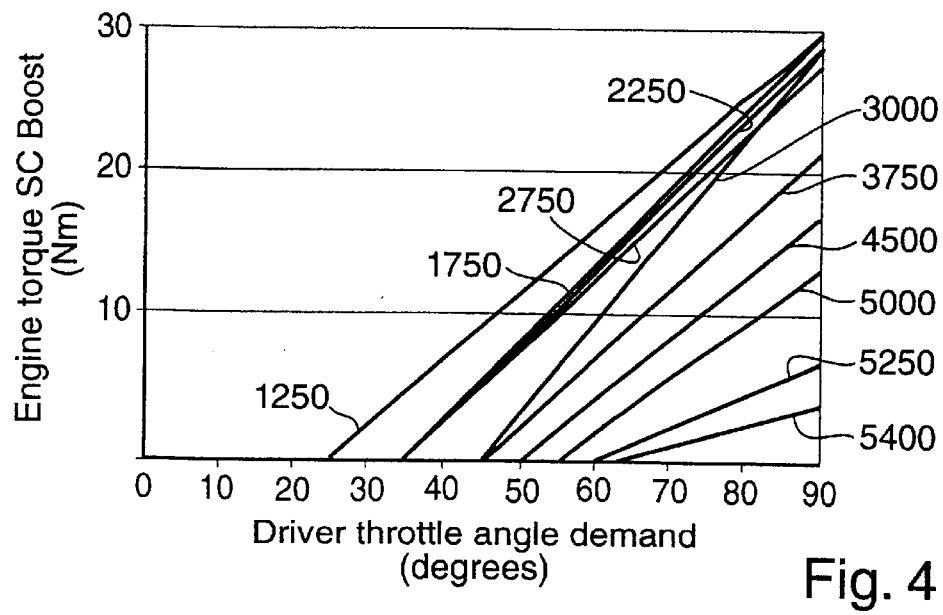
FIG. 4 is a graph plotting engine compressor torque boost against driver throttle engine demand for the engine of FIG. 1, showing the torque boost effect of the air charge boosting system at different engine speeds.

FIG. 4 shows a graph of engine torque supercharger boost against driver throttle angle demand between 0° and 90°. The diagonal straight lines on the graph are labelled with engine speed in rpm, between 1250 rpm and 5400 rpm. The vertical scale corresponds to the difference in engine torque in FIG. 3 between the boosted torque curve 40 and the un-boosted torque curve 38. At the maximum throttle angle 90°, the engine torque supercharger boost is the maximum value shown in FIG. 3. As throttle angle demands declines from 90°, so does the engine torque supercharger boost, until this declines to zero boost corresponding to curve 38 of FIG. 3.

As can be seen from FIG. 4, as the engine speed increases towards the transition point 48 of FIG. 3, the slope of the engine torque supercharger boost curve declines, until at the transition point 48, there is no engine torque supercharger boost. This shows graphically the progressive disabling of the supercharger boost.

The invention will now be described with reference to FIG. 5, which shows a schematic overview of an electronic control system 50 for controlling the operation of the supercharger 10, and also to FIG. 6, which shows a diagram of the control system architecture 60 of the air charge boosting system.

Figure 5:
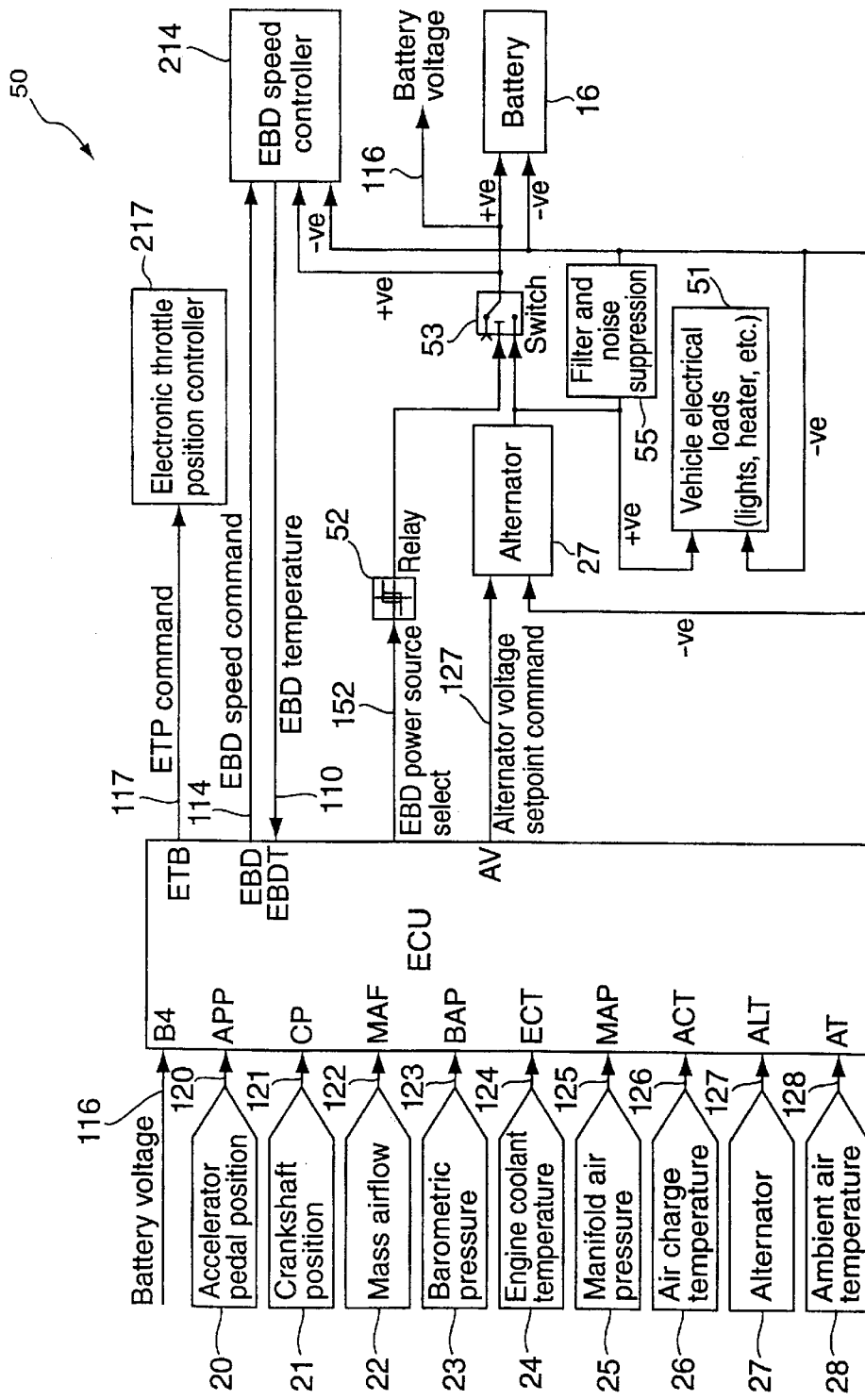
FIG. 5 is a schematic overview of the electronic control system for controlling the operation of the compressor.

FIG. 5 shows how the engine control unit (ECU) 32 receives the various inputs 116,120–128 described above, in order to generate various outputs to control the operation of the system. One output is an electronic throttle position (ETP) command 117, sent to an electronic throttle position controller 217 that controls the throttle 17. The ETP controller 217 then sets the position of the throttle 17 accordingly.

The ECU 32 also sends an EBD speed command 114 to an EBD speed controller 214 that controls the supercharger electric motor 14. When the supercharger 10 is not required, the motor 14 is controlled to idle at a relatively low and variable speed of up to about 20,000 rpm, which consumes relatively little electric power and which also produces no significant boost pressure. As will be explained in greater detail below, by idling the supercharger 10 at up to 20,000 rpm, it is possible to reduce the spin up time to the rated operating speed of about 60,000 rpm to less than 0.1 s.

The supercharger 10 may not be capable of indefinite operation at its maximum output owing to limitations of the battery 16 storage and alternator 27 charging current, and so the battery state-of-charge (SOC) may restrict operation. Additionally some components of the supercharger 10 such as bearings or motor windings (not shown) may exceed design temperature limits at high operation duty factors. The same considerations mean that the idling speed should also be limited. It may therefore also be necessary to constrain the operation of the supercharger 10 owing to these considerations.

Although the electrical power supply to the compressor 10 may be from the usual vehicle electrical system, it is preferred if the supercharger 10, during operation above idle speeds, is isolated at least partially from the battery charging system, including the alternator 27, and run mainly or entirely from the battery 16.

Therefore, the ECU 32 calculates allowable operating limits to the operation of the supercharger 10 based on the state of the electrical supply system. When the state of the electrical supply system is within an acceptable range, the supercharger 10 is driven using the engine-driven battery charging system and alternator 27, and when the state of the electrical supply system is not within an acceptable range, the battery 16 is isolated from the alternator 27 and the supercharger 10 is driven using the battery alone.

In the preferred embodiment of the invention, the ECU 32 determines the state of the electrical supply system both by monitoring the battery voltage, and by monitoring the capacity utilization of the alternator 27. If the electrical load on the alternator 27 becomes large enough to saturate the alternator 27, then electrical supply system voltage will drop, and this can cause a noticeable loss of functionality in other electrical units powered by the vehicle electrical system.

To prevent this happening, once the alternator reaches saturation point, the supercharger 10 during operation above idle speeds is isolated from the battery charging system and alternator 27 and run from the battery 16 alone. The alternator 27 is then able to power other vehicle consumer units (CU) 51, such as lights and electrical accessories, which are therefore isolated from voltage drops that may occur at the battery 16 owing to the large electrical current required by the supercharger 10, typically between about 150 A and 300 A. This switching is achieved by means of a compressor power source select command 152 sent from the ECU 32 to a relay 52 and switch 53.

The ECU 32 therefore drives the supercharger 10 using the alternator 27 when the battery state-of-charge is within an acceptable range, and isolates the battery 16 from the alternator 27 and drives the supercharger 10 using the battery 16 alone when the battery state-of-charge is not within an acceptable range.

The regulated voltage set point of the alternator 27 is then controlled by an alternator voltage setpoint command 127 sent from the ECU 32 to the alternator 27.

As described above, for all operating conditions that may be achieved without the operation of the supercharger 10, that is, when inlet manifold air pressure (MAP) 25 is less than barometric air pressure (BAP) 23, the engine torque output will be regulated by the throttle 17 alone. If the supercharger 10 is not required then the supercharger 10 is scheduled to operate at a variable idle speed where no boost is produced. In the event that the supercharger 10 is required then the throttle 17 is scheduled to be fully open and the supercharger speed is scheduled based on the barometric air pressure, the desired manifold air pressure, and the desired mass air flow according to a boost map of supercharger characteristics held within ECU memory (not shown).

Preferably, derating factors for the supercharger thermal and SOC constraints are applied as required to generate the final constrained EBD speed command 114. in the event that the system is constrained for both thermal limits and SOC considerations, then the largest derating factor is applied.

The calculation of the derating factors should be chosen so as to minimise driver perception of the derating, and also make the derated performance predicable for the driver, by avoiding sudden changes. The thermal derating calculation involves two parts, namely regulation and estimation. The estimation part of the calculation is based on the operating conditions of the compressor 10. Both the present and future steady state temperatures of critical parts of the supercharger 10 are estimated. Critical parts typically include the bearings supporting a compressor shaft and copper windings of the compressor motor. When the system is initialised, the temperatures of these parts are estimated based on the temperatures when the system was turned off, the time it has been off, and the prevailing ambient temperature, for example from the ambient temperature sensor 28. The dynamic temperature estimate accounts for variations in the air flowing past the supercharger 10, the thermal inertia of the component parts, and the heat generated in the system from both electrical and mechanical sources.

The regulation part involves predicting for which of the components in the system the design temperatures could be exceeded, based on estimated or measured temperatures. For these, the supercharger operation may be restricted in order to remain within design guidelines. This is achieved by the calibration of 'soft' and 'hard' limits for each of these components. When the temperature is below the soft limit no action is taken. When the temperature exceeds the soft limit and the temperature at the desired supercharger operation level will result in the hard limit being exceeded in a steady state operation, then some action must be taken to avoid exceeding the hard limit. The supercharger 10 is progressively derated using a control loop with an output of predetermined percentage degrade factor, until the predicted steady state temperature is equal to the hard limit, at which point the supercharger duty may be sustained. When more than one component of the system may exceed design values, a derating factor is calculated for each and the minimum one selected for use.

The battery state-of-charge calculation is performed in an analogous manner to the supercharger thermal calculation described above. An estimation part of the calculation involves a computer model of the storage capacity of the battery 16. This is used together with the history of the charging and discharging to make an estimate of the current stored charge compared to the maximum available at the prevailing ambient conditions. Additionally the rate of discharge is estimated.

The regulation is then performed as follows. When the power consumption of the supercharger 10 would saturate the alternator 27 power output, resulting in a fall in the vehicle system voltage as the battery 16 was used to supplement the alternator, unacceptable effects such as dimming of lights, etc. might be experienced. To prevent this, the relay 52 is engaged to switch 53 powering of the supercharger 10 to the battery 16 alone, whilst the remaining vehicle system is powered from the alternator 27.

A 'soft' limit is calibrated for the system state-of-charge (SOC) above which no action need be taken to protect battery charge. A 'hard' limit is also calibrated below which SOC the battery should not be allowed to fall. When SOC falls below the soft limit the system must start to take action so as to achieve a 'soft landing' at the hard limit of SOC without sharp falls in engine output due to reduction in power to the supercharger 10. The derate factor for the supercharger 10 is increased until the power drawn by the supercharger 10 is equal to the excess generation capacity of the alternator 27, at which point the relay 52 may be switched so as the alternator now powers the supercharger 10 as well as the remaining vehicle electrical system. The supercharger 10 power is then held at or below a level that does not cause the alternator 27 to fully saturate.

As mentioned above, when the supercharger 10 is not being used to boost the air pressure in the inlet manifold 4, the electronic control unit 32 controls the supercharger 10 at a variable idle speed. The idle speed is then controlled in order to reduce the lag time needed for the supercharger 10 to reach an operating speed when the electronic control unit 32 determines that it is likely that the supercharger 10 may soon be needed to boost the air flow to the engine 1. In other words, the idle speed is increased when the need for air flow boost becomes more likely, and reduced when the need for air flow boost becomes less likely. This is illustrated in FIGS. 6 to 13, which show how the electronic control unit 32 monitors the engine operating parameter(s) and calculates therefrom a likelihood that the engine torque will need to be boosted by the supercharger 10.

Figure 6:
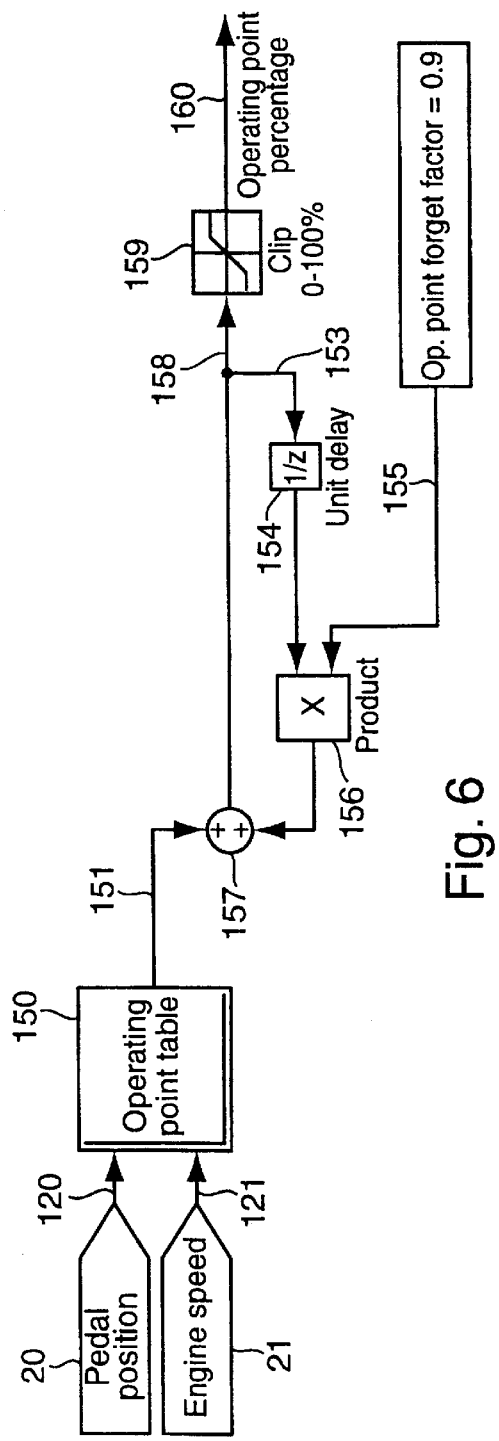
FIG. 6 is a flow diagram illustrating how an Engine Operating Point Percentage is calculated.
Figure 7:
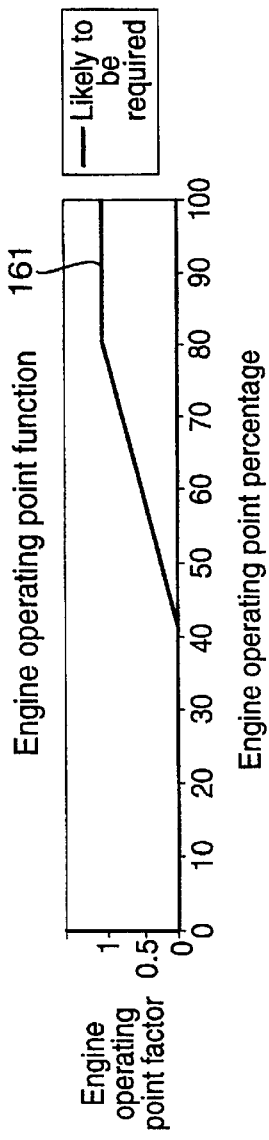
FIG. 7 is a plot of an Engine Operating Point Function, showing how an Engine Operating Point Factor varies between zero and one depending on the Engine Operating Point Percentage.
Figure 8:
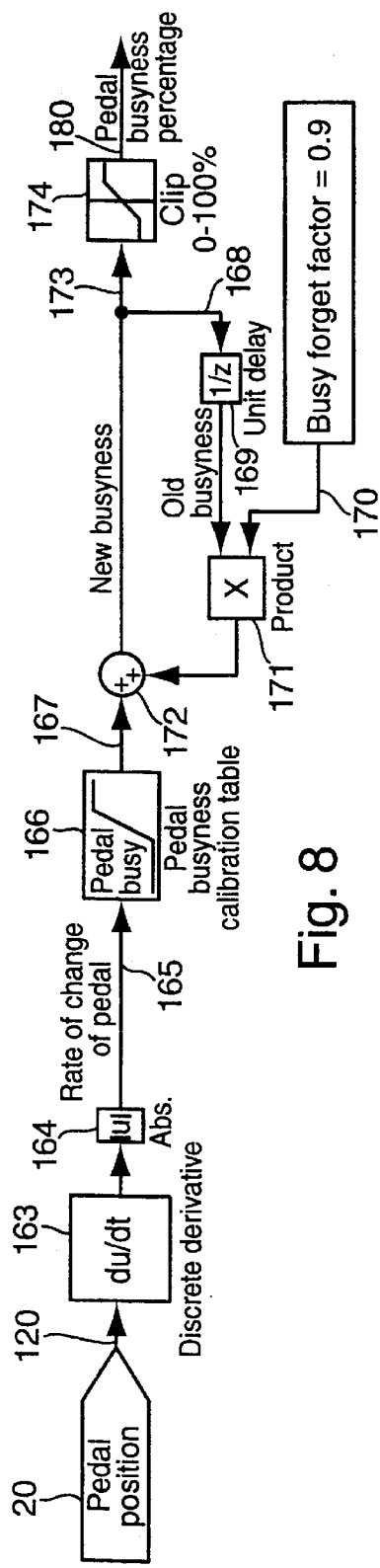
FIG. 8 is a flow diagram illustrating how an Accelerator Pedal "Busyness" Percentage is calculated.

FIGS. 6 and 8 show, respectively, how the history of engine operation and pedal position movement can be calculated, and then used as shown in FIGS. 7 and 8 to generate operating factors which are a measure of the likelihood that supercharger boost will be needed. The electronic control unit 32 uses the pedal position signal 120 and engine speed signal 121 together with a calibrated table 150 that is based on operating point data, such as that illustrated in FIGS. 3 and 4. The output 151 from the table 150 is high for engine operating conditions close to the point at which supercharger boost will be needed, and lower for engine operating conditions farther from the point at which supercharger boost will be needed.

The output 151 is fed back 153 and stored with a time delay 154 prior to being attenuated by multiplication 156 an operating point "forget factor" 155 of 0.9, before being combined 157 with the current operating point table output 151.

An output 158 from this adaptive loop is passed through a filter which clips 159 the value if necessary so that it falls within a range that represents 0 to 100%. The result of this process is an output 160 representing an operating point percentage for the engine 1.

Then, as shown in FIG. 7, the electronic control unit 32 converts the output 160 into an engine operating point factor 161, the use of which will be explained in more detail below.

Figure 9:
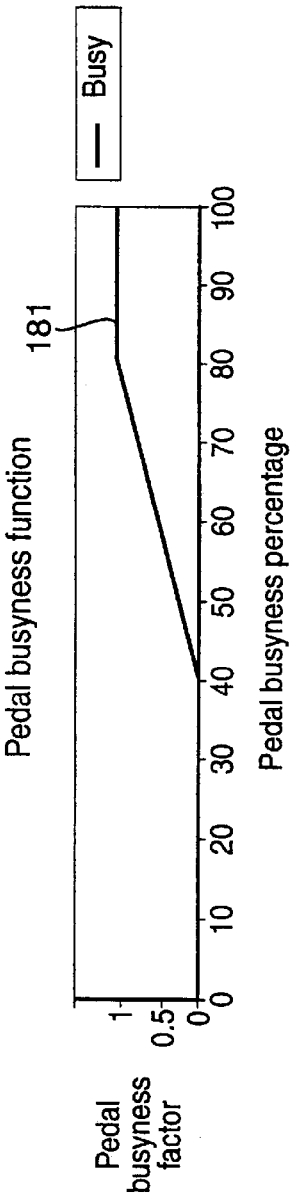
FIG. 9 is a plot of a Pedal "Busyness" Function, showing how a Pedal "Busyness" Factor varies between zero and one depending on the Pedal "Busyness" Percentage.

FIGS. 8 and 9 show a process very similar to that shown in FIGS. 6 and 7 for calculating an accelerator pedal "busyness" factor 181. First, the electronic control unit 32 takes a discrete derivative 163 of the accelerator pedal position signal 120. The absolute value 164 of the derivative is then a measure of the rate of change of pedal position, which is supplied as an input 165 to a pedal "busyness" calibration table 166.

The output 167 from the table 166 is high for a busy accelerator pedal, and low for an accelerator pedal that is not moved much or quickly.

The output 167 is fed back 168 and stored with a time delay 169 prior to being attenuated by multiplication 171 a pedal busyness "forget factor" 170 of 0.9, before being combined 172 with the current operating point table output 167.

An output 173 from this adaptive loop is passed through a filter which clips 174 the value if necessary so that it falls within a range that represents 0 to 100%. The result of this process is an output 180 representing a pedal "busyness" percentage for the pedal operation.

Then, as shown in FIG. 8, the electronic control unit 32 converts the output 180 into a pedal "busyness" factor 181, the use of which will be explained in more detail below.

Figure 10:
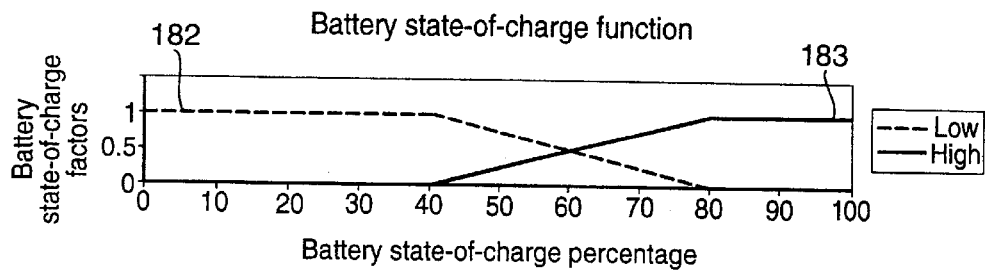
FIG. 10 is a plot of a Battery State-of-Charge Function, showing how a low and high Battery is State-of-Charge Factors vary between zero and one depending on a Battery State-of-Charge Percentage.
Figure 11:
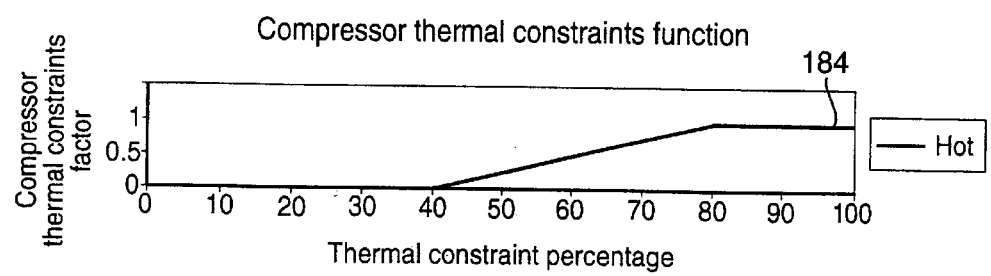
FIG. 11 is a plot of a Compressor Thermal Constrains Function, showing how a Compressor Thermal Constraints Factor varies between zero and one depending on the Compressor Thermal Constraints Percentage.

At the same time as the output factors 161, 181 are generated, the electronic control unit 32 also calculates any constraints on future operation of the supercharger 10 (hereinafter referenced as the "compressor"). FIG. 10 shows low and high battery state-of-charge factors 182,183 that vary between zero and one, and that are calculated from the battery voltage 116. FIG. 11 shows a compressor thermal constraint factor 184 that varies between zero and one, based on a compressor temperature that can either be measured from a temperature sensor (not shown), or calculated based on the history of the compressor operation, and ambient temperatures.

Figure 12:
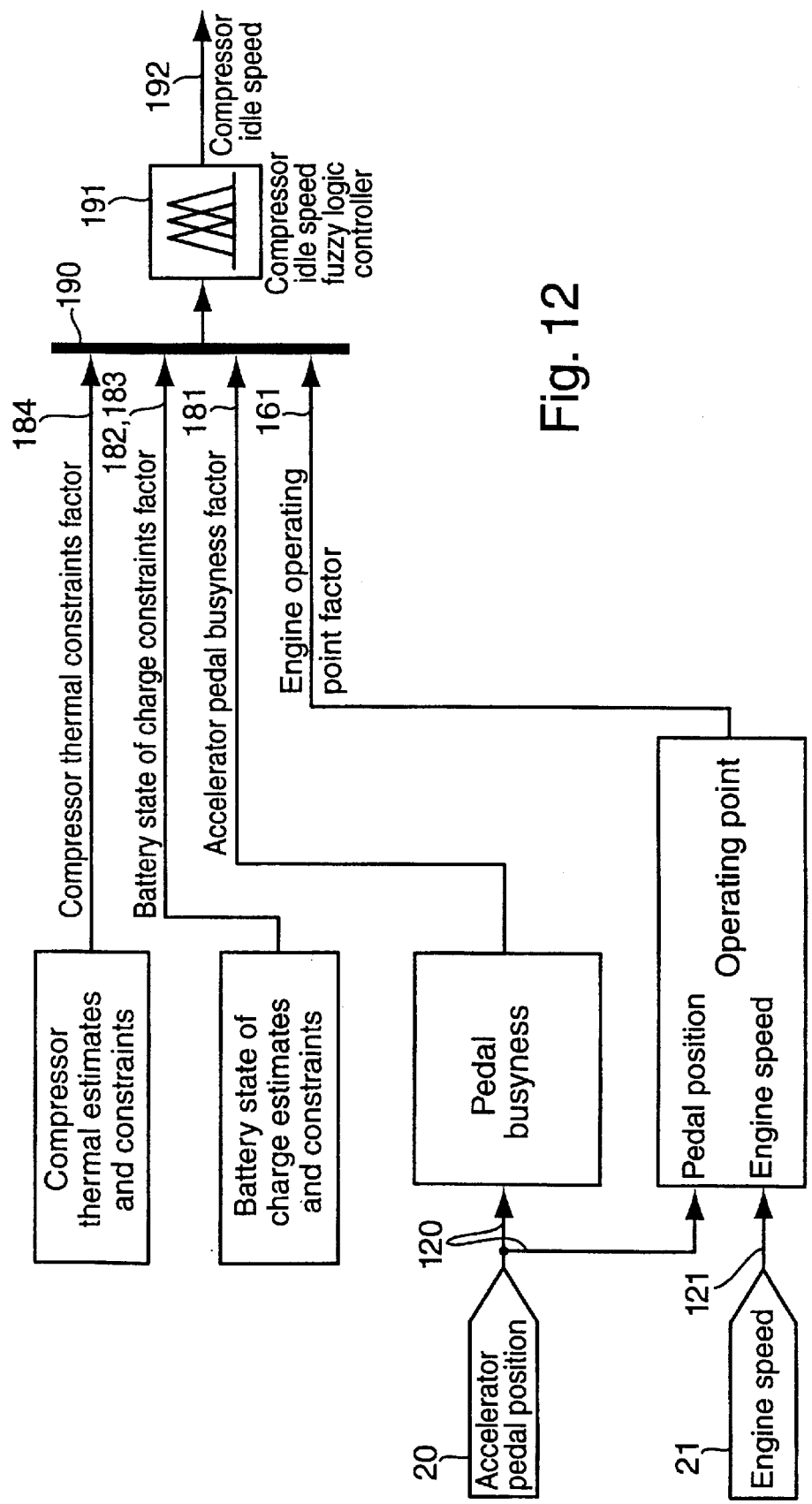
FIG. 12 is a flow diagram showing an overview of how the various calculated factors are combined using fuzzy logic to determine an appropriate Compressor Idle Speed.

FIG. 12 shows how the various factors 161, 181, 182, 183 and 184 are combined 190 in a fuzzy logic controller 191. The controller uses the following rules to generate compressor low and high idle speed factors 192, 193 that vary between zero and one, as shown in FIG. 13:

1) IF (state-of-charge factor is high) AND (thermal constraints factor is low) AND (pedal "busyness" is high) AND (engine operating point factor is high) THEN (idle is high)
2) IF (state-of-charge factor is low) THEN (idle low)
3) IF (pedal "busyness" factor is low) THEN (idle low)
4) IF (thermal constraints factor is low) THEN (idle low)

Figure 13:
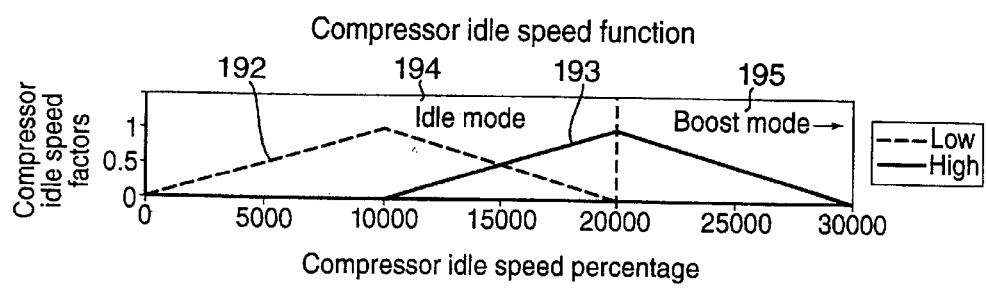
FIG. 13 is a plot of a Compressor Idle Speed Function, showing how a low and a high Compressor Idle Speed Factor varies between zero and one and how these factors relate to the determined appropriate Compressor Idle Speed.

Seen in FIG. 13, the compressor low idle speed factor 192 is an inverted V-shaped function that peaks in the centre of an idle mode of operation 194 and declines to zero at zero idle speed and at the top end of the idle mode of operation 194. The compressor high idle speed factor 193 is a similarly shaped function that peaks at a division between the idle mode of operation 194, and an engine boost mode of operation 195, and falls to zero the point where the low idle speed factor 192 peaks, and at a point well inside the boost mode of operation 195.

The degree of "highness" and "lowness" is then determined by the fuzzy logic, and when related to a low range of idle speeds (0–10,000 rpm) and a high range of idle speeds (10,000–20,000) rpm, is used to generate a compressor idle speed control signal 192, that is used by the engine control unit 32 to set an appropriate idle speed for the compressor 10, in order to reduce the lag time taken to bring the compressor 10 up to its operating speed when engine torque boost is required.

The invention described above is applicable to both spark ignition and compression engines. The electrically driven compressor 10 may be the only inlet air compressor device in the system, or it may be combined with another such device, for example an exhaust gas driven turbocharger device.

The invention therefore provides a convenient and economical electrical pressure boosting device and method for increasing the torque available from an internal combustion engine. The electrically driven compressor 10 is provided as part of the engine's air intake system, and is fully electronically controllable. Use of such a compressor 10 increases the engine's maximum torque output over portions of its operating range that are significant to the performance perceived by the driver. The lag time required to bring the compressor 10 up to operating speed to boost engine torque is reduced by the determination of an appropriate compressor idling speed, while excess electrical consumption and heating of the compressor while idling is reduced. The invention is compact, and avoids the need to increase excessively the capacity of the vehicle electrical system, or the thermal and mechanical rating of the device, thus allowing benefits in terms of both vehicle performance and overall fuel economy, at a reasonable system cost.

It is to be recognized that various alterations, modifications, and/or additions may be introduced into the constructions and arrangements of parts described above without departing from the spirit or scope of the present invention, as defined by the appended claims.

What is claimed is:

1. A torque boosting system for boosting the torque of an internal combustion engine, said system comprising means for generating at least one of engine operating parameters, an electrically driven rotary compressor for assisting aspiration of the engine to boost engine torque, an electrical supply system for providing electrical power to drive the compressor, and an electronic control system responsive to said at least one of the engine operating parameters to control the operation of the engine and the compressor such that in an idle mode of operation of the compressor said device does not assist the aspiration of the engine, and in a boost mode of operation of the compressor said device does assist the aspiration of the engine, wherein:
  a) the compressor in the idle mode of operation operates within a first range of speeds and in the boost mode of operation operates within a second range of speeds, the second range of speeds being greater than the first range of speeds;
  b) when activated by the electronic control system, the compressor requires a lag time to accelerate from an idle speed within the first range of speeds to a boost speed within the second range of speeds;
  c) the electronic control system monitors said at least one of the engine operating parameters and calculates therefrom a likelihood that the engine torque needs to be boosted by the compressor; and
  d) when the compressor is operating at an idle speed, the electronic control system controls said idle speed so that the lag time varies inversely with the calculated likelihood that the compressor is needed to boost engine torque.

2. A method of using a torque boosting system to boost the torque of an internal combustion engine, said system comprising means for generating one or more at least one of engine operating parameters, an electrically driven rotary compressor for assisting aspiration of the engine to boost engine torque, an electrical supply system for providing electrical power to drive the compressor, and an electronic control system responsive to said at least one of the engine operating parameters to control the operation of the engine and the compressor, wherein the method comprises the steps of:
  i) operating the compressor in an idle mode of operation within a range of idle speeds in which the compressor does not assist engine aspiration;
  ii) after step i), operating the compressor in a boost mode of operation within a range of boost speeds in which the compressor does assist engine operation, the compressor requiring a lag time in order to accelerate from an idle speed to a boost speed;
  iii) prior to step ii), using the electronic control system to monitor said at least one of the engine operating parameters, and to calculate therefrom a likelihood that the engine torque needs to be boosted by the compressor to meet future driver demand; and then
  iv) using the electronic control system to vary the idle speeds so that the lag time varies inversely with the calculated likelihood that the compressor is needed to boost engine torque.

3. The method of claim 2, in which the calculation of the likelihood that the engine torque will need to be boosted by the compressor to meet the future driver demand includes a calculation using the history of said at least one of the engine operating parameters.

4. The method of claim 3, in which the calculation of said likelihood is weighted towards said at least one of the engine operating parameters from more recent times rather than less recent times.

5. The method of claim 2, in which the system includes a speed control system for generating a driver demand signal, and wherein one of said at least one of the engine operating parameters is the driver demand signal.

6. The method of claim 2, in which the system includes a gear change system through which the engine torque is transmitted, and wherein one of said at least one of the engine operating parameters is the state of the gear change system.

7. The method of claim 2, in which the system includes an engine speed sensor, and wherein one of said at least one of the engine operating parameters is the engine speed.

8. The method of claim 2, in which said at least one of the engine operating parameters is a one limiting parameters that may restrict use of the compressor, the method comprising the step of:
  v) using the electronic control system to monitor said one of the limiting parameters, and to calculate therefrom a likelihood that said one of the limiting parameters limits the ability of the compressor to meet the future driver demand; and then
  iv) using the electronic control system to vary the idle speeds so that the lag time varies directly with the calculated likelihood that the ability of the compressor to meet the future driver demand is restricted.

9. The method of claim 8, in which the system comprises a compressor temperature sensor, and said one of the limiting parameters is the temperature of the compressor.

10. The method of claim 8, in which the system includes an electrical supply system for providing electrical power to drive the compressor, and said one of the limiting parameters is the ability of the electrical supply system to provide electrical power to drive the compressor to boost the engine torque.

11. The method of claim 10, in which the electrical supply system includes a battery and an engine-driven battery recharger, and the method comprises the step of isolating at least partially the battery from the engine-driven battery recharger to drive the compressor using the battery, said one of the limiting parameters being the battery state-of-charge.

12. The method of claim 11, in which the battery state of charge is determined from the battery voltage.

13. The method of claim 12, in which the electrical supply system includes a the battery and the engine-driven battery recharger, said state of the electrical supply system being an electrical load on the battery recharger.

14. The method of claim 8, in which the calculation of said ability of the compressor to meet the future driver demand includes a calculation using the history of at least one of the additional engine operating parameters.

15. The method of claim 14, in which the calculation of said ability of the compressor to the meet future driver demand is weiqhted towards said at least one of the additional operating parameters from more recent times rather than less recent times.

* * * * *

UNITED STATES PATENT AND TRADEMARK OFFICE
CERTIFICATE OF CORRECTION

PATENT NO. : 6,684,863 B2
DATED : February 3, 2004
INVENTOR(S) : Jon Dixon et al.

It is certified that error appears in the above-identified patent and that said Letters Patent is hereby corrected as shown below:

Title page,
Item [57], ABSTRACT,
Line 3, delete "Internal" and substitute -- internal -- in its place.

Column 13,
Line 3, after "generating" delete "one or more".

Column 14,
Line 23, before "limiting" delete "a one" and substitute -- one of -- in its place.
Line 59, after "includes" delete "a".

Signed and Sealed this

Seventeenth Day of August, 2004

JON W. DUDAS
*Acting Director of the United States Patent and Trademark Office*